United States Patent
del Prado et al.

(10) Patent No.: US 7,164,671 B2
(45) Date of Patent: Jan. 16, 2007

(54) OVERLAPPING NETWORK ALLOCATION VECTOR (ONAV) FOR AVOIDING COLLISION IN THE IEEE 802.11 WLAN OPERATING UNDER HCF

(75) Inventors: Javier del Prado, Ossining, NY (US); Sunghyun Choi, Montvale, NY (US); Amjad Ali Soomro, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1226 days.

(21) Appl. No.: 10/029,825

(22) Filed: Dec. 27, 2001

(65) Prior Publication Data

US 2003/0123405 A1    Jul. 3, 2003

(51) Int. Cl.
*H04Q 7/24* (2006.01)
*H04L 12/43* (2006.01)
*H04J 3/02* (2006.01)

(52) U.S. Cl. .................. 370/338; 370/447; 370/461; 370/462

(58) Field of Classification Search .................. None
See application file for complete search history.

(56) References Cited

U.S. PATENT DOCUMENTS 7,050,420 B1 * 5/2006 Findikli .................. 370/350
2003/0174664 A1 * 9/2003 Benveniste .............. 370/317

FOREIGN PATENT DOCUMENTS

WO    WO9835453    2/1998

* cited by examiner

*Primary Examiner*—Chau Nguyen
*Assistant Examiner*—Cynthia L. Davis
(74) *Attorney, Agent, or Firm*—Larry Liberchuk (57) ABSTRACT

The present invention is related to a medium access control (MAC) protocol for avoiding collisions among ESTAs when two or more overlapping basic service sets (OBSSs) co-exist and operate in the same channel. To achieve this, each mobile station operating under HCF maintains a first counter known as Network Allocation Vector (NAV) and a second counter known as Overlapping Network Allocation Vector (ONAV), which is updated within a mobile station by frames coming from OBSSs, during the Contention Free Period (CFP) or during a Contention Free Burst (CFB) granted by a polling frame. The mobile station uses the NAV to update only to the medium occupancy in its own BSS to ensure that the mobile station will not interfere with the transmissions in its own QBSS, while the ONAV is used to avoid collisions with the mobile stations from the OBSS.

28 Claims, 5 Drawing Sheets

OVERLAPPING NETWORK ALLOCATION VECTOR (ONAV) FOR AVOIDING COLLISION IN THE IEEE 802.11 WLAN OPERATING UNDER HCF

BACKGROUND OF THE INVENTION

1. Field of the Invention

The present invention relates to a wireless medium access control (MAC) protocol, and more particularly to a novel MAC protocol that may be used to avoid collisions among stations (STAs) from different overlapping basic service sets (OBSSs).

2. Description of Related Art

Basically, there are two variants of wireless local area networks (WLAN): infrastructure-based and ad hoc-type. In the former network, communication typically takes place only between wireless nodes, called stations ($STA_i$), and the access point (AP), not directly between the wireless nodes as in the latter network. Thus, the wireless nodes can exchange data via the AP. The stations and the AP, which are within the same radio coverage, are known as a basic service set (BSS). When two adjacent basic service sets (BSSs) are located close to each other and operate at the same channel, which are referred to as overlapping BSSs, it is difficult to support the required quality-of-service (QoS) due to the possible collisions among stations from different overlapping BSSs.

The IEEE 802.11 standard specifies the medium access control (MAC) and the physical (PHY) characteristics for wireless local area networks. The MAC layer is a set of protocols which is responsible for maintaining order in the use of a shared medium. The IEEE 802.11 standard is defined in International Standard ISO/IEC 8802-111, "Information Technology—Telecommunications and information exchange area networks," 1999 Edition, which is hereby incorporated by reference in its entirety.

The IEEE 802.11 provides a carrier sense multiple access with collision avoidance (CSMA/CA) protocol as well as polling mechanism for use as a random access protocol technique. Within such a network, if a transmitting unit wishes to transmit a packet, it may transmit a short request-to-send (RTS) packet containing information on the duration of the following packet. If the receiving unit receives the RTS, it responds with a short clear-to-send (CTS) packet. Then, the transmitting node sends its packet, and, when received successfully by the receiving node, the receiving node sends an acknowledgment (ACK) packet. However, a problem arises when there is a hidden transmitting station from the overlapping BSSs.

Currently, to address the above problem, the IEEE 802.11 specifies a Network Allocation Vector (NAV) as part of the virtual carrier sensing mechanism so that an STA, which is hidden from the transmitter of a frame, would not contend for the channel while the transmitter unit is occupying the channel. All STAs receiving a frame set their NAV for a given time period, using the duration/ID value contained in the frame, and utilize it jointly with their physical carrier sensing mechanism to determine if the medium is idle and, thus reducing the probability of collision.

Figure 1:
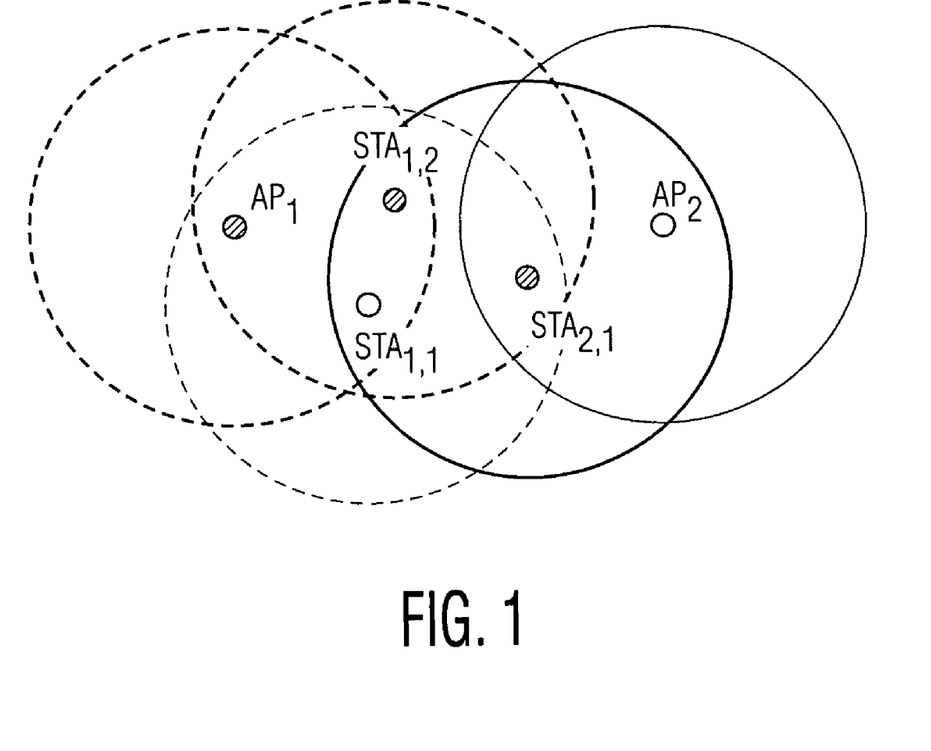
FIG. 1 is a schematic diagram depicting a wireless network whereto the embodiment of the present invention may be applied.

Although the NAV seems to be a plausible solution, it has some drawbacks in that if two ore more overlapping BSSs are collocated and operated in the same channel, some collisions may occur. For example, FIG. 1 shows an example of WLAN composed of an access point (AP) and a number of stations (STAs) where the problem of collisions may occur among STAs from different BSSs. As shown in FIG. 1, two OBSSs are represented by the coverage area of the corresponding AP ($AP_1$ and $AP_2$). $STA_{1,1}$ and $STA_{1,2}$ belong to the BSS of $AP_1$. If $AP_1$ sends a beacon indicating the beginning of the Contention Free Period (CFP), $STA_{1,1}$ and $STA_{1,2}$ will set the NAV to the duration of the CFP. But $STA_{2,1}$, which is out of the range of $AP_1$, will not. That means that eventually $STA_{2,1}$, which belongs to $BSS_2$, can transmit frames, e.g., RTS/CTS, that can cause a collision with frames sent or received by stations, i.e., $STA_{1,1}$ and $STA_{1,2}$, belonging to $BSS_1$ within its coverage area. In addition, a problem arises when $STA_{1,1}$ or $STA_{1,2}$, receives an RTS or a CF-END (+ACK) frame from an Overlapping BSS (from $AP_2$). In that case, according to the current standard rules, $STA_{1,1}$ and $STA_{1,2}$ may incorrectly reset the NAV if no frame is received after the RTS, and will incorrectly reset the NAV upon reception of the CF-END (+ACK) frame although the frame was not transmitted from its AP.

Accordingly, there exits a need to provide an improved mechanism to avoid potential collisions from the stations in the overlapping BSS.

SUMMARY OF THE INVENTION

The present invention provides a wireless MAC protocol to efficiently utilize bandwidth in a wireless LAN by avoiding collisions with stations (STAs) from different overlapping BSSs.

According to one aspect of the invention, a method of avoiding collisions between a plurality of stations located in two or more basic service sets (BSSs) and operating in the same channel is provided. The method includes the steps of: the mobile station receiving a frame, the frame including information indicative of which of basic service units (BSSs) are transmitting the frame to the mobile station; the mobile station updating a first counter when the received frame is determined to be from the same BSS; the mobile station updating a second counter when the received frame is determined to be from an overlapping BSS; and, the mobile station contending for the medium when the first counter and the second counter are idle, wherein the first counter is updated according to a duration specified in the received frame to ensure that the mobile station from its corresponding BSS will not interfere with the transmissions of other mobile stations within its BSS.Meanwhile, the second counter is updated according to a duration specified in the received frame to ensure that the station will not interfere with the transmissions in the overlapping BSS. If the received frame is a request-to-send (RTS) frame, a clear-to-send (CTS) frame is transmitted by the mobile station within its corresponding BSS when the second counter is idle. If the received frame is a CF poll frame from the AP, a data frame by the mobile station is transmitted within its corresponding BSS when the second counter is idle. If the received frame is a frame of any type that requires acknowledgement, an ACK frame is always transmitted by the mobile station, regardless of the value of the counters.

According to another aspect of the invention, a method of operating a wireless local area network (WLAN) of the type having at least one basic service set (BSS) comprised of one access point (AP) and a plurality of mobile stations (STAs) is provided. The method includes the steps of: transmitting a polling frame by the access points to the mobile station, the polling frame including information indicative of the destination address of the frame and which of basic service units are transmitting the polling frame to the mobile station; storing the information indicative of which basic service sets are transmitting the frame to the mobile station and storing the destination address of the polling frame as a transmitting source; updating a first counter of the mobile station according to the duration field specified in the polled frame; receiving a frame by the mobile station, the frame including information indicative of the duration of the next transmission; if the duration of the received frame is longer than the duration of the updated first counter, updating a second counter of the mobile station according to the duration indicated in the received frame; and, the mobile station contending for the medium if the first counter and the second counter indicate an idle state. The mobile station is allowed to contend for the medium if the first counter and the second counter indicate an idle state. The first counter is updated according to a duration specified in the received frame to ensure that the station will not interfere with rest of transmissions in its own BSS. The second counter is updated according to a duration specified in the received frame to ensure that the station will not interfere with the transmission between the stations in the overlapping BSS.

According to another aspect of the invention, a local area network is provided and includes: a plurality of mobile stations, each mobile station having a first counter and a second counter; one access point in communication with the plurality of mobile stations; and, means for updating the first counter and the second counter when any mobile station units receive a frame to ensure that the mobile station will not interfere with the overlapping basic service set (OBSS), wherein the mobile station is allowed to contend for the medium if the first counter and the second counter indicate an idle state. The mobile stations further includes means for utilizing request-to-send-(RTS)/clear-to-send(CTS) exchange to avoid potential interference with the transmission between the mobile station and its corresponding AP following the RTS/CTS exchange.

A further aspect of the invention provides a machine-readable medium having stored thereon data representing sequences of instructions for avoiding collisions from stations (STAs) comprising two or more basic service sets (BSSs) collocated and operating in the same channel, and the sequences of instructions which, when executed by a processor, cause the processor to: receive a frame, the frame including information indicative of which of basic service units are transmitting the frame to the mobile station; update a first counter when the received frame is determined to be from the same BSS; update a second counter when the received frame is determined to be from an overlapping BSS; and, the mobile station contending for the medium when the first counter and the second counter are idle. The first counter is updated according to a duration specified in the received frame to ensure that the mobile station will not interfere with the rest of transmissions in its own BSS. The second counter is updated according to a duration specified in the received frame to ensure that the station will not interfere with the transmissions in overlapping BSS.

BRIEF DESCRIPTION OF THE DRAWINGS

A more complete understanding of the method and apparatus of the present invention is available by reference to the following detailed description when taken in conjunction with the accompanying drawings wherein.

DETAILED DESCRIPTION OF THE INVENTION

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

To help understand the invention, the following definitions are used:

A "Distributed Coordination function (DCF)" is a class of coordination functions where the same coordination function logic is active in every station in the BSS whenever the network is in operation.

A "Point coordination function (PCF)" is a class of possible coordination functions where the coordination function logic is active in only one station in a BSS at any given time that the network is in operation.

A "Contention Free Period (CFP)" is a time period during which frame exchanges occur without intra-BSS contention.

A "Contention Period (CP)" is a time period during the operation of a BSS when a DCF, and the right to transmit is determined locally using a carrier sense multiple access algorithm with collision avoidance (CSMA/CA).

A Contention Free Period Repetition Interval (CFPRI) is the duration of a super-frame comprised of the CFP and the CP.

A "Hybrid Coordination Function (HCF)" is a coordination function that combines aspects of the DCF and the PCF to provide the selective handling of the medium access control (MAC) service data units (MSDUs) required for the QoS facility, and allows stations to use a uniform set of frame exchange sequences during both the CFP and the CP.

A "Transmission Opportunity (TXOP)" is an interval of time when a particular station has the right to initiate transmissions onto the wireless medium. A TXOP is defined by a starting time and a maximum duration.

A "Point Coordination Function (PCF) Interframe Space (PIFS)" is a priority level for accessing the wireless medium or a waiting time prior to any frame transmission.

In order to facilitate an understanding of this invention, a conventional method of the IEEE 802.11 MAC protocol will be described herein.

Figure 2:
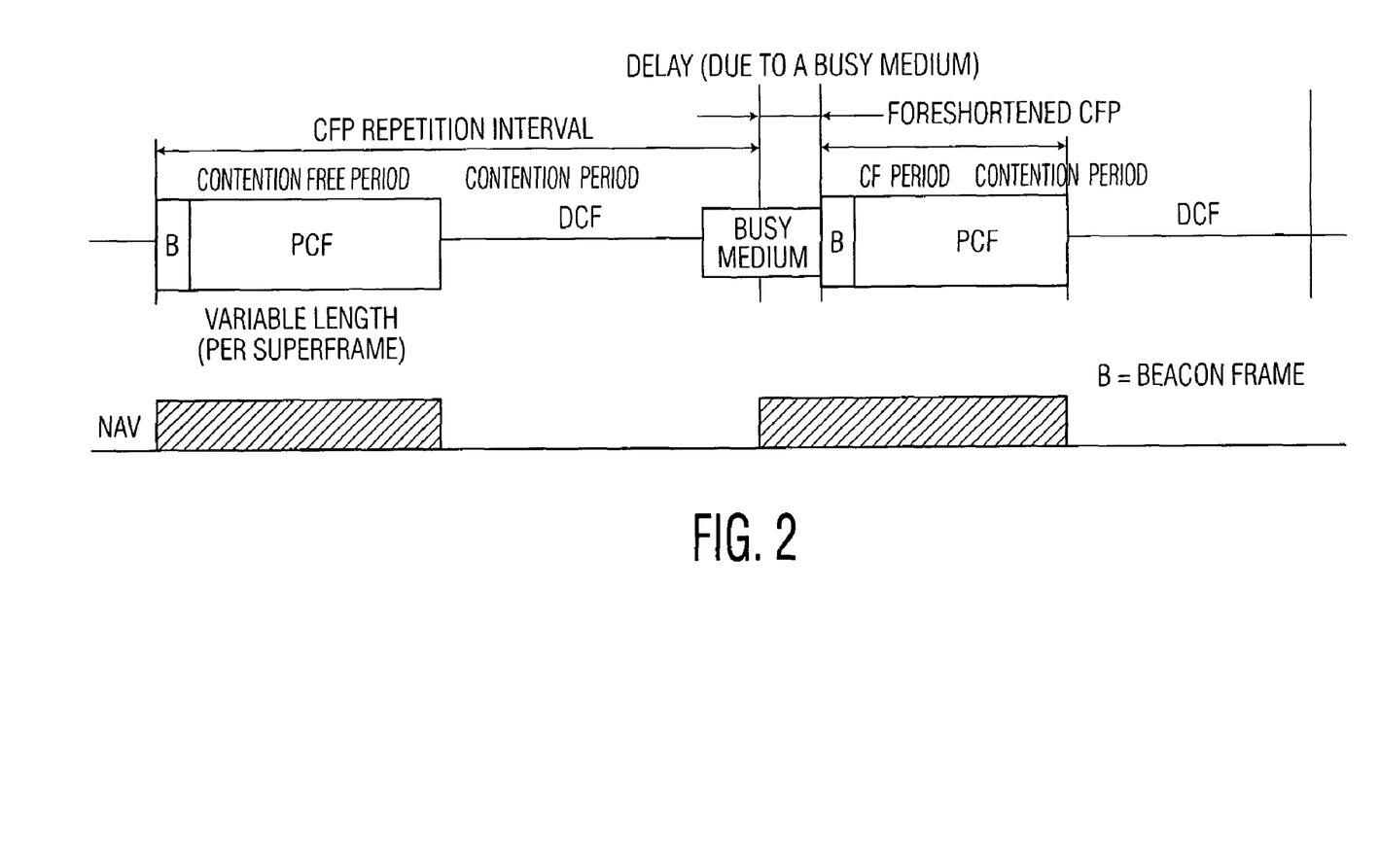
FIG. 2 shows the structure of a superframe depicting the coexistence of CFP and CP.

Referring to FIG. 2, the IEEE 802.11 MAC sub-layer defines two functions for accessing the wireless medium: distributed coordination function (DCF) and point coordination function (PCF). The DCF is used to transmit asynchronous data based on Carrier Sense Medium Access with a Collision Avoidance (CSMA/CA) mechanism as described earlier, while the PCF uses a polling mechanism for an isochronous service. Under the PCF access scheme, the transmission time is divided into super-frames, where each super-frame is composed of a Contention Free Period (CFP) and a Contention Period (CP). During the CFP, the PCF is used for accessing the medium, while the DCF is used during the CP. A CFP starts with a beacon frame and finishes with a CF-End frame both sent by the AP. The beacon frame includes the information about the duration of the CFP that is used to update the network allocation vector (NAV) of the STAs as well as the network synchronization information. A Target Beacon Transmission Time (TBTT) indicates the time when the AP attempts to transmit a beacon, so TBTTs repeat every beacon period. As such, the CFPRI is composed of a number of beacon periods.

As described earlier, the Network Allocation Vector (NAV) is defined in IEEE 802.11 as part of the virtual carrier sensing mechanism so that an STA, which is hidden from the transmitter of a frame, would not contend for the channel while the transmitter is occupying the channel. During the CFP, there is no competition for the medium as the NAV of each station sets to non-zero (non-idle). During this time, the station that is polled by the AP can only transmit by overriding the NAV. If the polled STA has any, it will transmit a frame. If the AP receives no response from the polled STA after waiting for a point inter-frame space (PIFS) interval, the AP may poll the next STA. The HCF of the proposed IEEE 802.11e QoS standard and the PCF in IEEE 802.11-1999 standard relies on the NAV for the operation of the CFP and CP, such that all the STAs other than the one polled by the HCF/HC implemented in the AP are kept silent even though they may not be able to hear from the polled STA.

Figure 3:
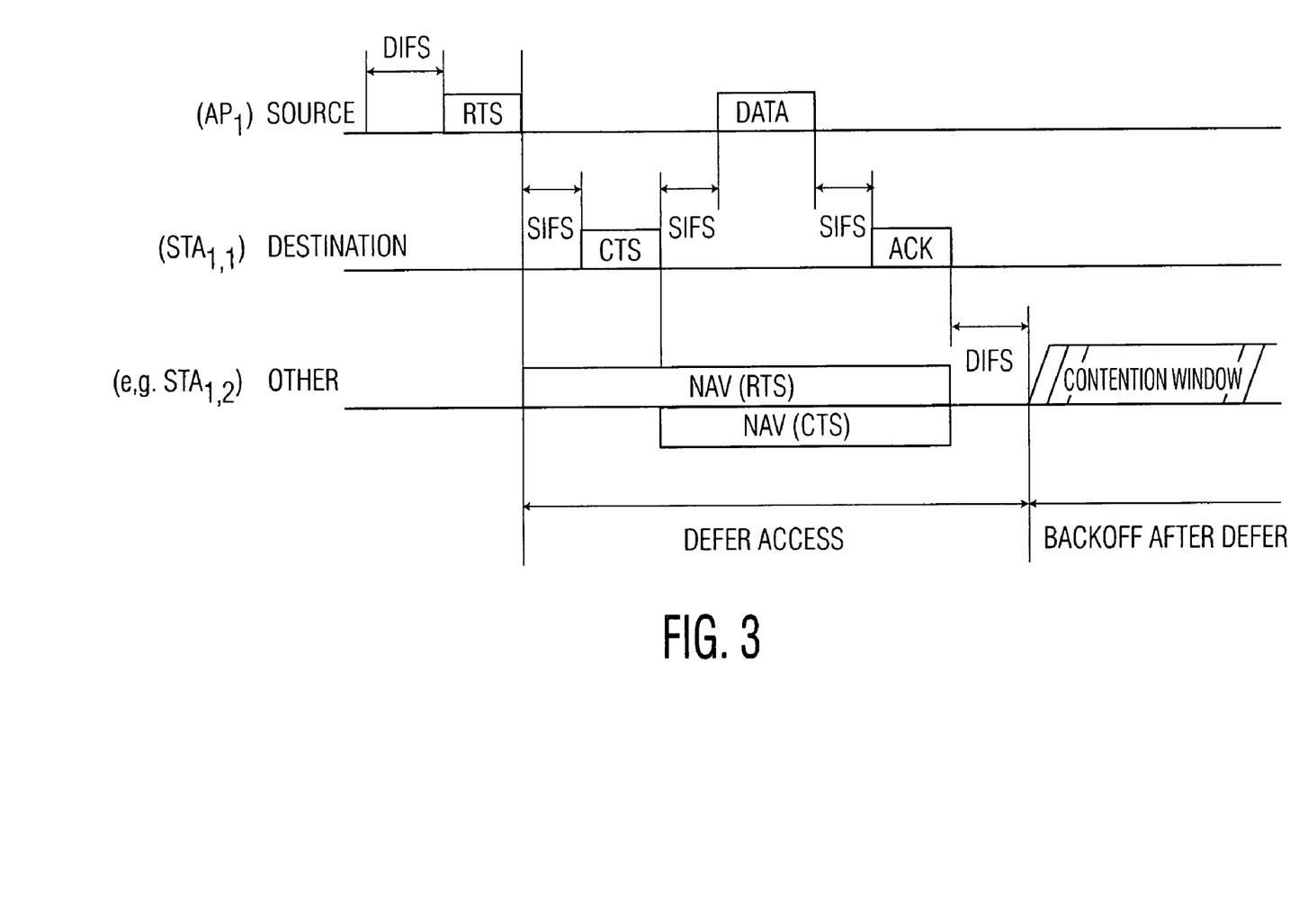
FIG. 3 is a timing diagram of a RTS/CTS exchange during CFP.

FIG. 3 shows the exchange of the RTS/CTS frames during a CFP as described in the preceding paragraph. As shown in FIG. 3, $AP_1$ transmits an RTS to the $STA_{1,1}$ to which the $STA_{1,1}$ responses with a CTS. Thereafter, all the STAs, except the intended $STA_{1,1}$ which received the RTS set their NAV to a busy state for the duration as specified in the received RTS. That is, the $STA_{1,2}$ will set up the NAV with the Duration/ID value in the received RTS frame, and will not interfere with the transmission between $STA_{1,1}$ and $AP_1$ following the RTS/CTS exchange. At this time, if the $STA_{1,2}$ does not receive any CTS or data frame after receiving the RTS signal for a predetermined time period, the $STA_{1,2}$ will reset its NAV to zero (idle). However, a problem arises at this time if the $STA_{1,2}$ receives an RTS with no subsequent CTS or Data from the $STA_{2,1}$ that is located in the neighboring or overlapping BSS or if the $STA_{1,2}$ receives CF-end poll from $AP_2$, the $STA_{1,2}$ will reset its NAV to zero (idle). As the $STA_{1,2}$ will react to the frames arrived from an overlapping BSS by resetting its NAV incorrectly, it will cause an interference with the signal exchanges surrounding the $AP_1$. Moreover, according to the 802.11 PCF mechanism, $STA_{2,1}$ will transmit a frame if it has any data for transmission upon being polled by $AP_2$ irrespective of the value of its NAV. Such transmission by $STA_{2,1}$ may result in a collision with another transmission during the CFP of $STA_{2,1}$'s neighboring BSS.

In order to overcome the prior art problem described above, the present invention employs the NAV in conjunction with the inventive new counter, the Overlapping Network Allocation Vector (ONAV), in order to avoid collisions with stations (STAs) from the overlapping basic service sets (BSSs), which is updated within an STA by frames coming from OBSSs, during the Contention Free Period (CFP) or during a Contention Free Burst (CFB) granted by a QoS (+)CF-Poll. That is, each station maintains and updates two sets of counters, the NAV and the ONAV, to make a decision to transmit a frame within its own BSS accordingly. The STAs will be able to update their NAV only according to the medium occupancy in their own BSS, while using the value of the ONAV to avoid collisions with the OBSS and protecting their BSS by sharing the medium with overlapping STAs.

In the embodiment, the ONAV is updated with the same rule of the original/existing conventional methods for updating an NAV as set forth in IEEE 802.11 MAC with one exception. The exception is that the ONAV is updated with the values of the Duration ID/field carried by frames coming from OBSSs only, not the frames from their own BSS. Note that the ONAV is updated only during the CFP and CFB under the HCF operation. In addition, the ONAV requires that if an STA has a non-zero ONAV, the STA will not respond to the QoS (+)CF-poll from its AP.

Now, the provision of avoiding collisions with the OBSS using the ONAV and updating the NAV by the stations according to the medium occupancy in their own BSS is described in detail.

First, the provisions of determining whether the frames are from a neighboring BSS is necessary when maintaining and updating the NAV and the ONAV. As the frames, including the RTS/CTS/ACK, received by a particular station do not contain the BSS ID information, the process of determining such information in accordance with the present invention is explained in reference to FIGS. 4 and 5.

Figure 4:
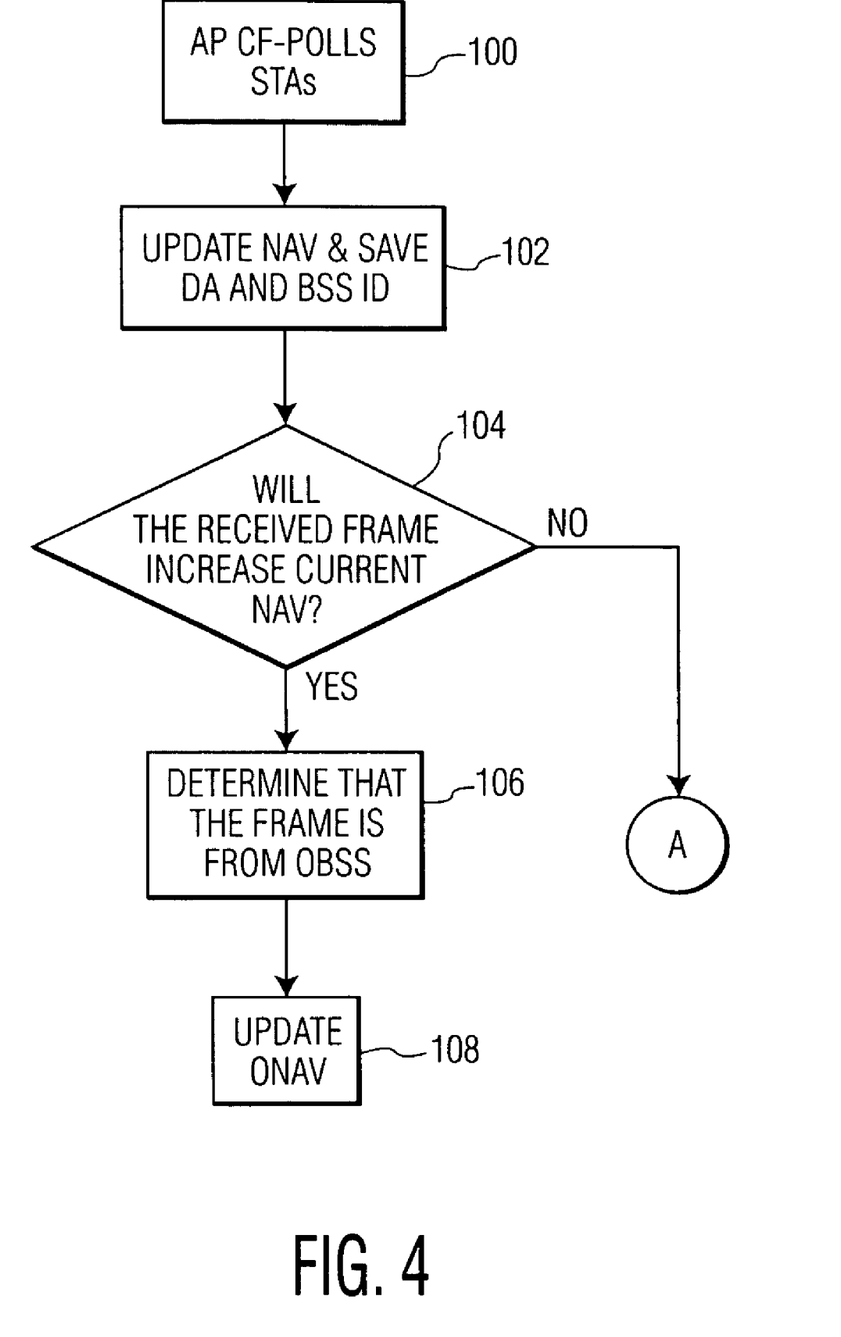
FIG. 4 is a flow chart illustrating the operation steps of determining whether a received frame is from the overlapping BSS according to an embodiment of the present invention.

Referring to FIG. 4, the updating process initiated when the HC QoS (+)CF-polls every station in step 100. After receiving the QoS (+)CF-Poll in the CP, every STA updates its NAV with the duration of the TXOP granted by the QoS (+)CF-Poll plus DIFS, and saves the value of the Destination Address (DA) and the BSSID carried in the QoS (+)CF-Poll in step 102. The value of DA is saved as a transmission source (TXsrc). In the CFP, the STAs may not update their NAV, but will save the value of the DA (as TXsrc) and the BSSID carried in the QoS (+)CF-Poll.

After receiving the QoS (+)CF-Poll, the STAs are able to differentiate if any frame is coming from their own BSS or not based on the TXsrc information. If an STA receives a frame with a Duration/ID field in step 104, which will increase the NAV value, it is determined that this frame is coming from an OBSS in step 106. As a result, the ONAV is updated in step 108, not the NAV, with the Duration/ID field from the received frame. At the same time, the overlapping BSSID, if available, is saved.

Figure 5:
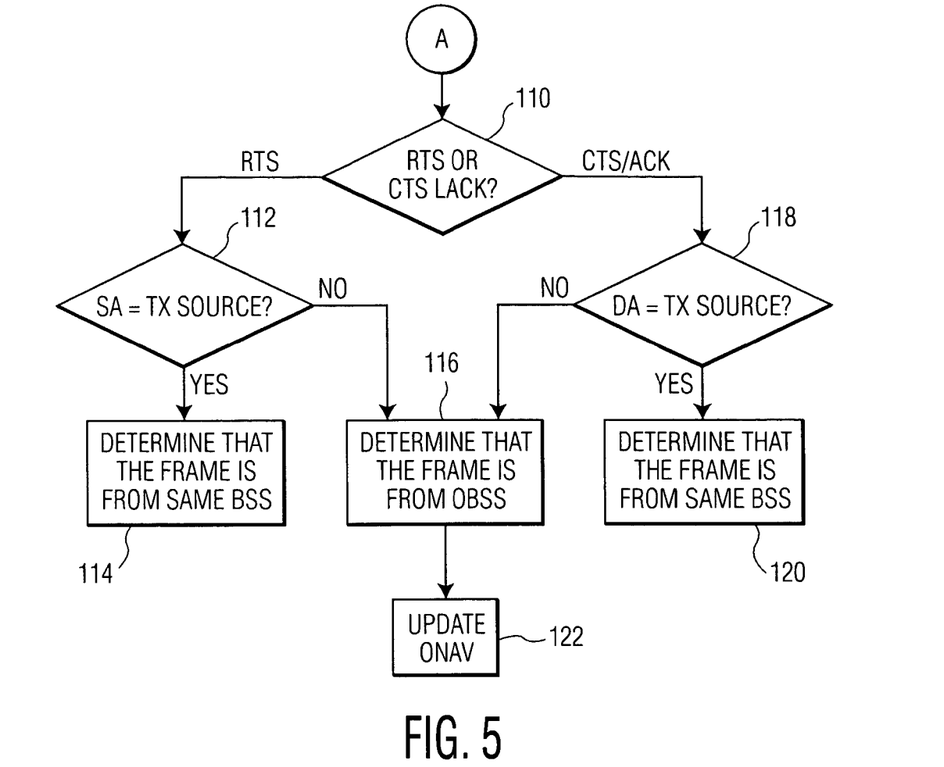
FIG. 5 is a flow chart illustrating the operation steps of determining whether a received frame is from the overlapping BSS according to an embodiment of the present invention; and, FIG. 6 is a schematic diagram depicting different instances where a station is allowed to transmit according to an embodiment of the present invention.

If an STA receives a frame with a Duration/ID field in step 104, which will not increase the NAV value, it is possible that the frame arrived from the same BSS. To determine if the frame was coming from the same BSS, the operation steps described in FIG. 5 are performed, as described below.

In step 110, an STA classifies the reception of a frame into two: an RTS frame and CTS/ACK. The skilled artisan will note that the RTS and CTS/ACK frames do not contain the BSSID field. In step 108, if the received frame is the RTS, the STA can determine that the frame is coming from the same BSS when the source address (SA) of the RTS frame is the same as the TXsrc that was saved recently in step 102. That is, if the SA address of the RTS frame is equal to TXsrc, the frame is considered coming from the same BSS in step 110. Otherwise, it was coming from the OBSS and the STA will update the ONAV with the Duration/ID field from the received frame in step 116.

Meanwhile, if the CTS/ACK frame is received by the station in step 110, the STA can determine that the frame is coming from the same BSS when the Destination address (DA) of the CTS/ACK frame is the same as the TXsrc that was saved recently in step 102. That is, if the DA of the RTS frame is equal to TXsrc, the frame is considered coming from the same BSS in step 120. Otherwise, it was coming from the OBSS and the STA shall update the ONAV in step 116. Here, the DA is used instead of the SA as the CTS/ACK does not contain the SA information.

Finally, once determined that the frame is coming from the OBSS, the ONAV is updated in step 118, not the NAV, with the Duration/ID field from the received frame, but only when the new ONAV value is greater than the current ONAV.

Figure 6:
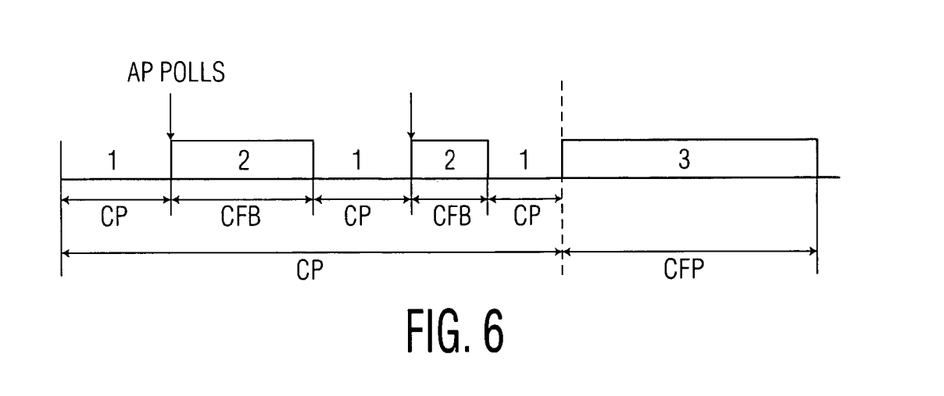

After determining whether frames received by the STA are from the OBSS and updating the ONAV thereafter, each STA is allowed to transmit within its own BSS when both the NAV and the ONAV indicate that the medium is zero or idle (i.e., NAV=ONAV=0) to avoid collisions due to OBSS. However, there are special instances that an STA may or may not transmit upon reception of QoS (+)CF-Poll, RTS frames and/or frames of a type that requires acknowledgement. FIG. 6 shows three such cases in which an STA is allowed to transmit, in response to a control signal, only upon satisfying certain conditions as set below.

For the non-CFB Contention Period (CP: regions indicated by number 1), a QSTA can response to the RTS with CTS only when the NAV and ONAV of the STA are set equal to zero. If an STA receives a QoS (+)CF-Poll and its NAV and ONAV are equal to zero, the STA is allowed to respond to the QoS (+)CF-Poll if the QoS (+)CF-poll is intended to the STA. Then, the STA sets the NAV according to the duration field indicated in the QoS (+)CF-poll. However, if an STA receives a QoS (+)CF-Poll and its NAV or ONAV is non-zero, the STA cannot reply to the QoS (+)CF-Poll even if it was for itself. Here, the STA saves the maximum value out of (NAV, ONAV) in the ONAV counter but sets the NAV using the Duration/ID field specified in the QoS (+)CF-Poll frame.

For the Contention Free Burst (CFB: regions indicated by number 2), STAs will respond to a QoS (+)CF-Poll and respond to RTS from the TxOP holder with CTS only when the ONAV is zero. It should be noted that NAV is already activated in this region.

For the Contention Free Period (CFP: region indicated by number 3), at TBTT when a CFP is scheduled to start, if an STA has non-zero NAV, then the STA assumes that its NAV was set in the contention period by an OBSS. Thus, the STA will save the maximum value of (NAV, ONAV) in the ONAV counter, but sets the NAV using the dot11CFPMaxDuration/ID field specified in the beacon frame. Here, STAs will respond to a QoS (+)CF-Poll and to an RTS from the TxOP holder with CTS only when the ONAV is zero.

In all three above cases, STAs will always generate an ACK frame, upon successful reception of the frame of a type that requires acknowledgement, without regard to the busy/idle state of the medium.

Having thus described a preferred embodiment for reducing the considerable number of collisions due to an overlapping BSS, it should be apparent to those skilled in the art that certain advantages have been achieved. The concept of ONAV is intended to protect its BSS from the OBSSs as well as to be fair to the OBSSs by not transmitting when the OBSSs need to be protected.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed:

1. A method for avoiding collisions between a plurality of stations located in two or more basic service sets (BSSs) and operating in the same channel, the method comprising the steps of:
    the mobile station receiving a frame, the frame including information indicative of which of basic service sets (BSSs) are transmitting the frame to the mobile station;
    the mobile station updating a first counter when the received frame is determined to be from its corresponding BSS;
    the mobile station updating a second counter when the received frame is determined to be from an overlapping BSS; and,
    the mobile station transmitting within its corresponding BSS when the first counter and the second counter are zeros.

2. The method of claim 1, wherein the first counter is updated according to a duration specified in the received frame to ensure that the mobile station will not interfere with the transmissions in its corresponding BSS.

3. The method of claim 2, wherein the received frame is determined to be from the overlapping BSS if the duration specified in the received frame is greater than a previous duration of the first counter upon reception of a QoS (+)CF-Poll frame.

4. The method of claim 1, wherein the second counter is updated according to a duration specified in the received frame to ensure that the station will not interfere with the transmissions in an overlapping basic service set (OBSS).

5. The method of claim 1, further comprising the step of transmitting an acknowledgement by the mobile station in response to the received frame irrespective of the value of the counters.

6. The method of claim 1, wherein, if the received frame is a request-to-send (RTS) frame during a contention period, transmitting a clear-to-send (CTS) frame by the mobile station within its corresponding BSS when the first counter and the second counter are zeros.

7. The method of claim 1, wherein, if the received frame is a request-to-send (RTS) frame during a contention-free period, transmitting a clear-to-send (CTS) frame by the mobile station within its corresponding BSS when the second counter is zero.

8. The method of claim 1, wherein, if the received frame is a request-to-send (RTS) frame during a contention-free burst, transmitting a clear-to-send (CTS) frame by the mobile station within its corresponding BSS when the second counter is zero.

9. A method of operating a wireless local area network (WLAN) of the type having at least one basic service set (BSS) comprised of at least one access point (AP) and a plurality of mobile stations (STAs), the method comprising the steps of:
    (a) transmitting a polling frame by the at least one of the access points to the mobile station, the polling frame including information indicative of the destination address of the frame and which of the basic service units are transmitting the polling frame to the mobile station;
    (b) storing the information indicative of which basic service sets are transmitting the frame to the mobile station and storing the destination address of the polling frame as a transmitting source;
    (c) updating a first counter of the mobile station according to the duration field specified in the polled frame;

(d) receiving a frame by the mobile station, the frame including information indicative of the duration of the first counter;
(e) if the duration of the received frame is longer than the duration of the updated first counter, updating a second counter of the mobile station according to the duration indicated in the received frame; and,
(f) transmitting by the mobile station within its corresponding BSS if the first counter and the second counter are zeros.

10. The method of claim 9, wherein, if the duration of the received frame is not longer than the duration of the updated first counter, determining that the received frame is from an overlapping basic service set.

11. The method of claim 9, further comprising the steps of:
determining whether a source address of the received frame is equal to the transmitting source obtained in step (b) if the duration of the received frame is not longer than the duration of the updated first counter; and,
if not, updating the second counter of the mobile station according to the duration indicated in the received frame.

12. The method of claim 11, further comprising the step of transmitting by the mobile station within its corresponding BSS if the first counter and the second counter are zeros.

13. The method of claim 11, further comprising the steps of:
determining whether a destination address of the received frame is equal to the transmitting source obtained in step (b) if the duration of the received frame is not longer than the duration of the updated first counter; and,
if not, updating the second counter of the mobile station according to the duration indicated in the received frame.

14. The method of claim 13, further comprising the step of transmitting within its corresponding BSS by the mobile station if the first counter and the second counter are zeros.

15. The method of claim 9, wherein the first counter is updated according to a duration specified in the received frame to ensure that the station will not interfere with the transmissions in the BSS.

16. The method of claim 9, wherein the second counter is updated according to a duration specified in the received frame to ensure that the mobile station will not interfere with the transmissions in an overlapping basic service set (OBSS).

17. The method of claim 9, further comprising the step of transmitting an acknowledgement by the mobile station within its BSS irrespective of the value of the counters.

18. The method of claim 9, wherein, if the received frame is a request-to-send (RTS) frame during a contention period, transmitting a clear-to-send (CTS) frame by the mobile station within its corresponding BSS when the first counter and the second counter are zeros.

19. The method of claim 9, wherein, if the received frame is a request-to-send (RTS) frame during a contention-free period, transmitting a clear-to-send (CTS) frame by the mobile station within its corresponding BSS when the second counter is zero.

20. The method of claim 9, wherein, if the received frame is a request-to-send (RTS) frame during a contention-free burst, transmitting a clear-to-send (CTS) frame by the mobile station within its corresponding BSS when the second counter is zero.

21. The method of claim 9, wherein, if the received frame is a QoS (+)CF poll frame from the AP, transmitting data by the mobile station within its corresponding BSS when the second counter is zero.

22. A local area network comprising:
a plurality of mobile stations, each mobile station having a first counter and a second counter;
at least one access point in communication with the plurality of mobile stations; and,
means for updating the first counter and the second counter when any mobile station units receive a frame to ensure that the mobile station will not interfere with the transmissions in its corresponding basic service (BSS) or in the overlapping basic service set (OBSS), wherein the mobile station is allowed to transmit within its corresponding basic service set (BSS) if the first counter and the second counter are zeros, wherein the first counter is updated when the received frame is determined to be from its corresponding BSS and the second counter is updated when the received frame is determined to be from the OBSS.

23. The network of claim 22, wherein the plurality of mobile stations further comprising means for transmitting an acknowledgement in response to the received frame irrespective of the value of the counters.

24. The network of claim 22, wherein the plurality of mobile stations further comprise means for utilizing request-to-send-(RTS)/clear-to-send(CTS) exchange to avoid potential interference with the transmissions in the QBSS following the RTS/CTS exchange.

25. A machine-readable medium having stored thereon data representing sequences of instructions for avoiding collisions from stations (STAs) comprising two or more basic service sets (BSSs) collocated and operating in the same channel, and the sequences of instructions which, when executed by a processor, cause the processor to:
receive a frame, the frame including information indicative of which of basic service sets are transmitting the frame to the mobile station;
update a first counter when the received frame is determined to be from its corresponding BSS;
update a second counter when the received frame is determined to be from an overlapping BSS; and,
transmit by the mobile station within its corresponding BSS when the first counter and the second counter are zeros.

26. The machine-readable medium of claim 25, wherein the first counter is updated according to a duration specified in the received frame to ensure that the mobile station will not interfere with the transmissions in its corresponding overlapping basic service set (OBSS).

27. The machine-readable medium of claim 25, wherein the second counter is updated according to a duration specified in the received frame to ensure that the station will not interfere with the transmissions in an overlapping basic service set (OBSS).

28. The method of claim 25, wherein the process is further operative to transmit an acknowledgement by the mobile station in response to the received frame irrespective of the value of the counters.

* * * * *